March 26, 1968  G. HESKESTAD  3,374,971
FLUID DYNAMIC DRAG REDUCTION
Filed Aug. 2, 1965  2 Sheets-Sheet 1
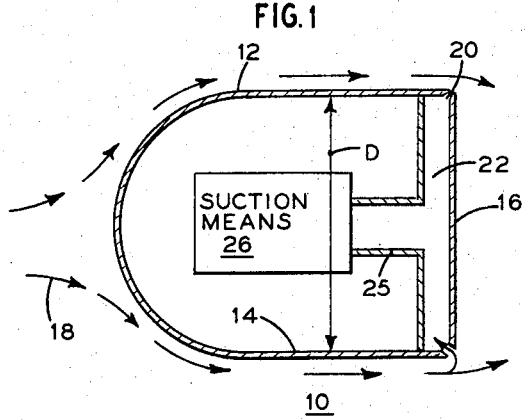
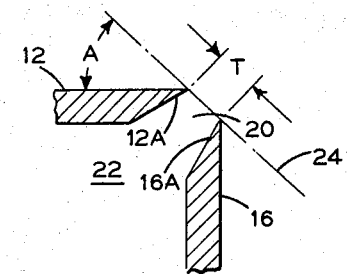
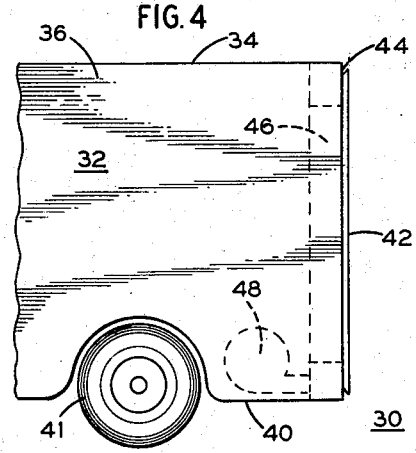
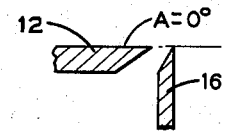
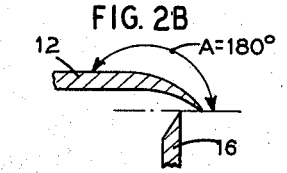
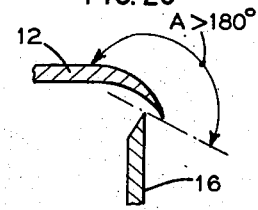
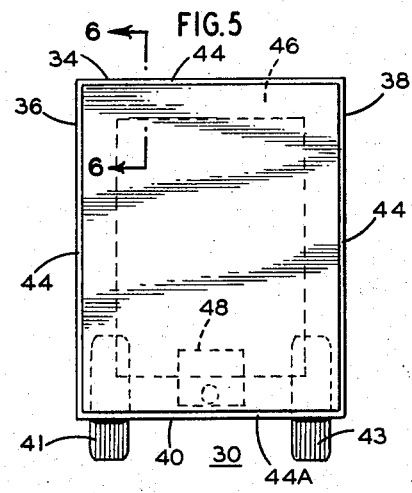
INVENTOR.
Gunnar Heskestad
BY Eli Weiss
ATTORNEY March 26, 1968  G. HESKESTAD  3,374,971
FLUID DYNAMIC DRAG REDUCTION
Filed Aug. 2, 1965  2 Sheets-Sheet 2

INVENTOR.
Gunnar Heskestad
BY
Eli Weiss
ATTORNEY

United States Patent Office
3,374,971
Patented Mar. 26, 1968

3,374,971
FLUID DYNAMIC DRAG REDUCTION
Gunnar Heskestad, East Brunswick, N.J., assignor to American Standard Inc., New York, N.Y., a corporation of Delaware
Filed Aug. 2, 1965, Ser. No. 476,447
10 Claims. (Cl. 244—130)

This invention pertains to the reduction of fluid dynamic drag and more particularly to the reducing of form drag exerted on a bluff-ended body moving with respect to a homogeneous medium.

Fluid dynamic drag is present for all bodies moving in a homogenous medium. Such drag is generally of two types, "skin-friction" drag and "form" drag. Skin-friction drag arises from the friction at the interface of the air and surface of the body. Form drag arises from the relatively stagnant fluid wake immediately behind the trailing end of the body and for instance accounts for more than half of the fluid dynamic drag for smooth axisymmetric bodies with bluff ends when the length to diameter ratio is less than about ten. Of course, it is possible to reduce form drag by streamlining the body, as witnessed by the profile of wings in a conventional subsonic aircraft and racing cars or present-day "fast back" sports cars. However, there are many instances when streamlining of the trailing end of the body is not possible. For example, in supersonic jet aircraft it has been found that for good transonic aerodynamic performance and unimpaired supersonic performance the profile of a wing section should have a bluff trailing edge. However, during subsonic flight, the bluff trailing edge introduces form drag which limits the available amount of propulsion.

Another example concerns hovercraft vehicles or ground effect machines. The cabin shape of such vehicles has a bluff rear end. When such vehicles have a horizontal component of velocity typical of present day cruising speeds, the form drag is a substantial part of the total drag of the craft.

Another example concerns road vehicles such as trailer trucks and buses. At low road speeds, that is, below approximately twenty miles per hour, rolling resistance due to friction and tire deformation accounts for the major portion of the total resistance. However, as road speed increases, aerodynamic drag rises at a much higher rate than rolling resistance. In fact, aerodynamic drag increases with the square of the velocity. For example, a modern intercity bus with rounded front edges has a drag coefficient of about 0.5. When such a road vehicle is traveling at about seventy miles per hour, the power to overcome aerodynamic drag, the major portion of which is form drag, is approximately four times that required to overcome rolling resistance. In the interest of economy, it is clearly desirable to reduce the drag component of resistance to a minimum. For special purpose road vehicles such as racing cars form drag can be reduced by streamlining the body by slowly tapering its cross section toward the rear. However, in the case of buses and trucks, the load requirements make this remedy impractical. Hence, such vehicles sacrifice power because of the requirement for a bluff rear end.

It is, accordingly, a general object of the invention to reduce the drag on a body moving within and relative to a homogeneous fluid medium.

It is another object of the invention to reduce the aerodynamic form drag on the bluff trailing edge of an aircraft wing.

It is a further object of the invention to reduce the aerodynamic form drag on hovercraft vehicles moving horizontally in air.

It is yet another object of the invention to improve the operating efficiency and lower the operating cost of a bluff ended road vehicle by minimizing the form drag created while the vehicle is moving at normal highway speeds.

Briefly, the invention contemplates reducing the fluid dynamic drag on a bluff ended body moving through a homogeneous fluid by removing a portion of the fluid flowing over the peripheral edge of the bluff end. Such a fluid removal reduces the wake cross-section, with a consequent rise in the average pressure over the surface of the bluff rear end of the body.

Other objects and many of the attendant advantages of this invention will be readily appreciated as the apparatus becomes better understood by reference to the following detailed description when considered in connection with the accompanying drawings wherein:

FIG. 1 shows a sectional view of a bluff ended body including a slotted peripheral edge along its bluff end;

FIG. 2 is an enlarged sectional view of the slotted peripheral edge;

FIG. 2A is an enlarged sectional view of the slotted peripheral edge illustrating an angle of zero degrees;

FIG. 2B is an enlarged sectional view of the slotted peripheral edges illustrating an angle of one hundred and eighty degrees;

FIG. 2C is an enlarged sectional view of the slotted peripheral edge illustrating an angle in excess of the one hundred and eighty degrees;

FIG. 4 is a side view of a bluff-ended trailer truck road vehicle incorporating the invention;

FIG. 5 is a rear end view of the trailer truck of FIG. 4.

Figure 3:
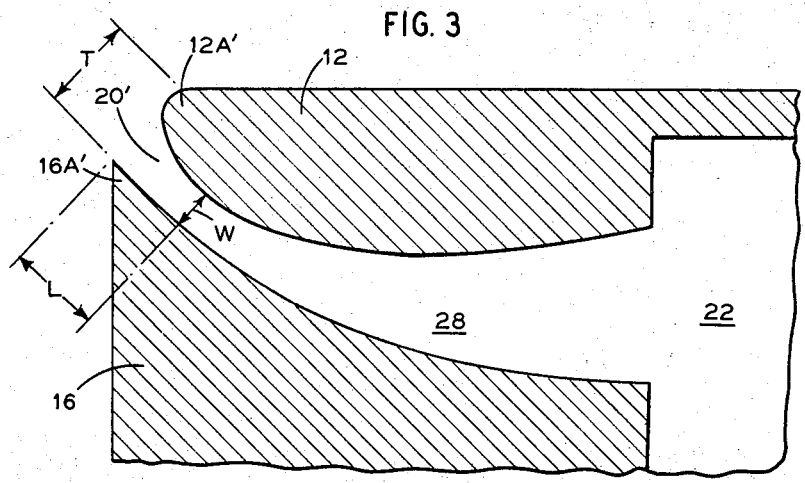
FIG. 3 is an enlarged sectional view of an alternate embodiment of the slotted peripheral edge.

Referring now to FIG. 1, a body 10 having sidewalls 12 and 14 and a bluff end wall 16 is shown moving with respect to a homogeneous fluid 18 such as air. The peripheral edge between the sidewalls 12, 14 and end wall 16 is provided with an opening such as slot 20 which can be either continuous or discontinuous. Slot 20 provides communication between the outside of body 10 and a suction chamber 22. Suction chamber 22 is connected by conduit 25 to suction means 26. As the air, represented by streamlines 18, flows over side walls 12 and 14 and moves past slot 20, a portion of the air is sucked into the slot. It has been found that by removing a portion of the fluid moving over a discontinuity, the region of turbulence beyond the discontinuity is minimized. Consequently, the wake cross-section is reduced and the drag is reduced. Tests on models have shown that peripheral edge suction can reduce the drag coefficient of the models by at least one-half and it appears that slot geometry and suction rate relationships will result in greater reduction in drag coefficient.

Referring to FIG. 2, one embodiment of the slot will now be described. The tips 12A and 16A of the sidewall 12 and end wall 16 are preferably tapered. The plane 24 of slot 20, i.e., a plane simultaneously contacting tips 12A and 16A makes an angle A of between zero and greater than one hundred and eighty degrees with the plane of sidewall 12.

With reference to FIG. 2A, there is illustrated a slot arrangement where angle A is equal to zero degrees. FIG. 2B illustrates one possible arrangement of obtaining an angle A of one hundred and eighty degrees; and FIG. 2C illustrates a slot arrangement where the angle A is greater than one hundred and eighty degrees. Furthermore, wall 16 need not be straight, it being possible to have an end wall 16 which is either curved or angled or is shaped to be both curved and angled.

Referring again to FIG. 2, for minimum suction power requirements at a given angle A, the gap thickness T should be as small as possible. When the gap thickness is reduced below a lower limit, however, the drag reduction effect diminishes. The lower limit for most bodies is thought to be in the order of 0.005 times the sidewall width D (FIG. 1). The required suction power for a given gap thickness increases with increasing angles A, but so does the drag reduction effect. It has been found from related experiments that angle A can be in the range of zero up to and beyond one hundred and eighty degrees for a substantial effect. The particular angle to be chosen should be obtained by weighing the increase in drag reduction power against increment in suction requirement power associated with each increment of angle A. The bluff body considered may be two-dimensional, axisymmetric, or may have almost any cross-section, where the suction gap is placed along the trailing edge. The flow ahead of the suction slot should be attached to the upstream surface. It has been found, in practice, that there will be no detachment if all bluff protrusions from the basic surface ahead of the slot are located more than about ten protrusion heights upstream of the slot. It is reasoned that good results will be obtained if the end wall surface is smooth for at least two gap thicknesses beyond the slot.

To provide a device which permits a reduction in the suction power required, the slot embodiment of FIG. 3 can be utilized. Slot 20' is connected to suction chamber 22 by diffuser conduit 28. The total area expansion ratio from minimum cross-section W to the chamber 22 can be in the order of about three to one, and the radius of curvature of the walls should be small compared to the local width. In addition, the distance L from tip 16A' to minimum cross-section region W can be approximately equal to the gap thickness T. Additionally, the transition of tip 16A' to the diffuser conduit 28 can be smooth and the tip 12A can be curved.

Figure 6:
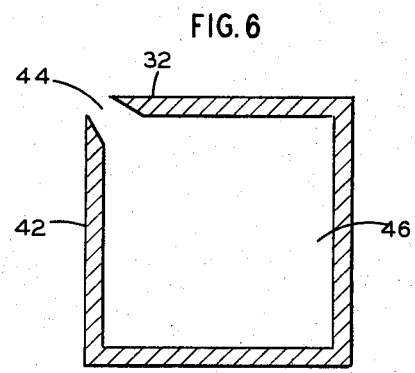
FIG. 6 is an enlarged sectional view taken along the line 6—6 of FIG. 5 showing the details of the peripheral edge slot.

Specific embodiments of the bluff-ended bodies will now be described. FIGS. 4 and 5 show a moving road vehicle in the form of a truck 30 having a body 32 with a top wall 34, sidewalls 36 and 38, bottom wall 40 and bluff rear end wall 42. End wall 42 is adjacent to the walls and defines therewith a peripheral edge. The entire peripheral edge is provided with a slot 44 which communicates with suction chamber 46. See, also, FIG. 6. Suction chamber 46 is connected to suction means 48 in the form of a motor driven suction pump. Suction pump 48 applies suction to chamber 46 causing a portion of the air flowing past slot 44 to be drawn off.

It should be noted that the protuberances introduced by wheels 41 and 43 may limit the effectiveness of the suction applied by the portion 44A of the slot. In such a case, this portion of the slot may be deleted. The cross section of the vehicle may of course be other than rectangular, as long as a fairly uniform suction slot is incorporated along the trailing edge.

The aerodynamic form drag is reduced in the same way as described for FIG. 1. Furthermore, the geometry of slot 44 is similar to the geometry of slots 20 and 20' of FIGS. 2 and 3 respectively.

Figure 7:
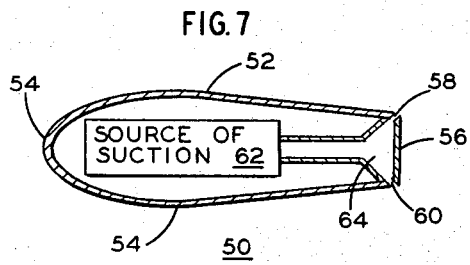
FIG. 7 shows a sectional view of an aircraft wing having a bluff trailing edge which practices the invention.

In FIG. 7, there is shown schematically the cross-section of a wing 50 found suitable for a supersonic aircraft. The thickness to chord ratio is greatly exaggerated for clarity. The top and bottom surfaces 52 and 54 aerodynamically taper from leading edge 54 to the base 56, providing a bluff trailing edge. Along the peripheral edge junctions of the base 56 and top and bottom surfaces 52 and 54 are suction slots 58 and 60. Slots 58 and 60 communicate with source of suction 62 via suction chamber 64. The utilization of peripheral edge suction to reduce aerodynamic drag at subsonic speeds is the same as previously described. For supersonic flight little penalty in drag due to the bluff trailing edge (with no particular flow control means) is realized for practical airfoils. The main advantage of the bluff trailing edge occurs at transonic speeds, again with no extra flow control means. Edge suction is therefore to be applied advantageously at subsonic speeds (landing and take-off). The geometry of slots 58 and 60 is similar to slots 20 and 20' of FIGS. 2 and 3.

Figure 8:
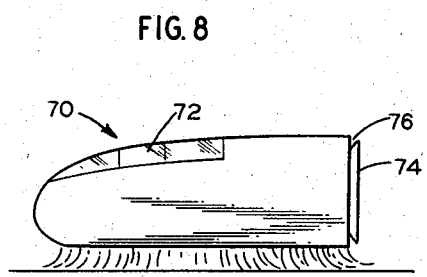
FIG. 8 shows a view of a hovercraft or ground effect vehicle utilizing the invention.

As a further example of the utilization of peripheral edge suction in reducing aerodynamic drag, a hovercraft vehicle is shown in FIG. 8. Vehicle 70 has a cabin 72 with a bluff end wall 74. Disposed along the entire peripheral edge of end wall 74 is a suction slot 76 which is connected to a source of suction (not shown). The operation of the system and the geometry of the slot 76 are the same as previously described. Accordingly, they will not be described.

There has thus been shown an improved method of minimizing the fluid dynamic drag of a bluff ended body moving relative to a homogeneous medium by applying suction to the peripheral edge of the bluff end to minimize the wake cross-section and raise the average pressure over the surface of the bluff rear end of the body.

In addition, particular embodiments of the invention have been shown particularly with respect to moving vehicles to increase their efficiency of operation. In fact, with respect to a road vehicle such as an intercity bus there should be a power saving of about twenty percent.

It should be noted that, although the invention has been described with respect to bodies having particular cross-sections, the invention is utilizable with bodies of any cross-section.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Obviously many modifications and variations of the present invention are possible in the light of the above teachings. It is, therefore, to be understood that within the scope of the appended claims the invention may be practiced otherwise than as specifically described.

What is claimed is:

1. The method of minimizing the aerodynamic form drag on an aircraft wing which has top and bottom surfaces and a flat bluff trailing surface and which is moving through air at subsonic velocities, which consists in applying suction through a substantially uniform and continuous slot positioned along the peripheral edge between at least one of said top and bottom surfaces and said bluff trailing surface, said slot having at least one rounded edge and being connected through a conduit of uniformly varying cross-section to a source of suction, and maintaining said suction so as to draw air over said rounded edge through said slot and said conduit to said source of suction.

2. The method of minimizing the aerodynamic form drag on a hoverplane which has a velocity component parallel to the surface of the ground, said hoverplane having side portions and a flat bluff rear end portion and having two substantially continuous slots each at the trailing edge between the side portions and the bluff rear end portion, comprising applying suction along the peripheral edge between said side portions and said bluff rear end portion to divert the external fluid toward the vertical centerline of the rear end portion.

3. In combination, a body for movement in a homogeneous fluid, said body including sidewalls and a substantially flat bluff rear wall connected along its peripheral edge to the adjacent peripheral edge of said sidewalls, a peripheral slot being provided along at least portions of the junction of the peripheral edges of said sidewalls and said rear wall, and means within said body for applying suction to said peripheral slot, said slot being coupled to said suction means by a continuous smooth diffuser conduit of uniformly varying cross-section to maintain such suction throughout said conduit.

4. The combination of claim 3 wherein the width of said slot is at least 0.005 times the distance between opposed walls.

5. An aircraft wing comprising top and bottom aerodynamic surface portions extending rearward from a leading edge, a substantially flat bluff rear wall portion connected to said surface portions and defining a peripheral edge, said peripheral edge being provided with a continuous slot at least one side of which is rounded, and means within said surface portions for applying suction to said slot over a continuous path through a diffuser conduit to maintain such suction throughout said conduit.

6. In a hoverplane, a cabin including sidewalls and a substantially flat bluff rear end wall connected to define a peripheral edge, said peripheral edge being provided with a continuous slot at least one side of which is rounded and extending along said peripheral edge, and means for applying suction to said slot, said slot being coupled to said suction means by a continuous, smooth conduit diffuser of uniformly varying cross-section to maintain said suction throughout said conduit.

7. A road vehicle comprising a body portion, said body portion including at least a top wall, sidewalls and a substantially flat bluff rear wall, said bluff rear wall being coupled to the rear ends of said top and sidewalls, the coupling between said bluff rear wall and said top and sidewalls sharply defining a peripheral edge, said peripheral edge being provided with a continuous tapered slot extending along substantially the entire peripheral edge, and means for applying suction to said slot, said slot being coupled to said suction means by a continuous, smooth diffuser conduit of uniformly varying cross-section to maintain said suction throughout said conduit.

8. A road vehicle comprising a body portion, said body portion including at least a top wall, sidewalls and a substantially flat bluff rear wall, said bluff rear wall being coupled to the rear ends of said top and sidewalls, the coupling between said bluff rear wall and said top and sidewalls sharply defining a peripheral edge, portions of said peripheral edge being provided with a continuous tapered slot, the plane of said slot making an angle of between zero and greater than one hundred and eighty degrees with the associated top and sidewalls, and means for applying suction to said slot to minimize fluid dynamic form drag, said slot being coupled to said suction means by a continuous, smooth diffuser conduit of uniformly varying cross-section to maintain said suction throughout said conduit.

9. A road vehicle comprising a body portion, said body portion including at least a top wall, sidewalls and a substantially flat bluff rear wall, said bluff rear wall being coupled to the rear ends of said top and sidewalls, the coupling between said bluff rear wall and said top and sidewalls defining a peripheral edge, said peripheral edge being provided with a tapered slot, the width of said slot being substantially equal to or greater than 0.005 times the distance between opposed walls, and means for applying suction to said slot in order to bend external fluid into the wake region of said bluff rear wall, said slot being coupled to said suction means by a continuous, smooth diffuser conduit of uniformly varying cross-section to maintain such suction throughout said conduit.

10. A road vehicle comprising a body portion, said body portion including at least a top wall, sidewalls and a substantially flat bluff rear wall, said bluff rear wall being coupled to the rear ends of said top and sidewalls, the coupling between said bluff rear wall and said top and sidewalls defining a peripheral edge, said peripheral edge being provided with a slot extending along at least a portion of the peripheral edge, a suction chamber within said body, a diffuser conduit of uniformly varying cross-section interposed between said slot and said suction chamber, and means for applying suction to said suction chamber in order to bend external fluid into the wake region of said bluff rear wall.

References Cited

UNITED STATES PATENTS

| | | | |
|---|---|---|---|
| 2,037,942 | 4/1936 | Stalker | 244—130 X |
| 2,554,187 | 5/1951 | Griffith | 244—130 X |
| 2,569,983 | 10/1951 | Favre | 244—130 X |
| 2,692,742 | 10/1954 | Schwarzmayr | 244—130 |
| 2,894,703 | 7/1959 | Hazen et al. | 244—130 X |
| 3,205,959 | 9/1965 | Cockerell | 180—7 |

FOREIGN PATENTS 223,203    12/1925    Great Britain.

FERGUS S. MIDDLETON, *Primary Examiner.*

MILTON BUCHLER, *Examiner.*

B. BELKIN, *Assistant Examiner.*